United States Patent

Spearman

[11] Patent Number: 5,376,272
[45] Date of Patent: Dec. 27, 1994

[54] FILTER ASSEMBLY INCLUDING A FILTER AND CLOSURE MEMBER

[75] Inventor: Michael R. Spearman, St. Paul, Minn.

[73] Assignee: Porous Media Corporation, St. Paul, Minn.

[21] Appl. No.: 149,038

[22] Filed: Nov. 8, 1993

[51] Int. Cl.⁵ .................... B01D 35/02; B67D 5/58
[52] U.S. Cl. .................... 210/463; 210/473; 222/189; 222/464
[58] Field of Search ........... 222/189, 464; 210/440, 210/443, 172, 463, 473

[56] References Cited

U.S. PATENT DOCUMENTS

| | | | |
|---|---|---|---|
| 1,747,277 | 9/1927 | Weldon | 417/179 |
| 3,618,822 | 11/1971 | Hildenbrandt | 222/464 |
| 3,954,623 | 5/1976 | Hammer et al. | 210/436 |
| 4,014,696 | 3/1977 | Sugiyama et al. | 430/47 |
| 4,293,414 | 10/1981 | Gianneli | 210/193 |
| 4,654,142 | 3/1987 | Thomsen et al. | 210/232 |
| 4,725,354 | 2/1988 | Thomsen et al. | 210/232 |
| 4,836,925 | 6/1989 | Wolf | 210/323.2 |
| 4,936,993 | 6/1990 | Nomura | 210/446 |
| 5,139,654 | 8/1992 | Carpenter | 210/136 |
| 5,160,444 | 11/1992 | McFarland | 210/138 |
| 5,199,606 | 4/1993 | Nutting | 222/464 |
| 5,217,627 | 6/1993 | Pall et al. | 210/257.1 |

Primary Examiner—Robert A. Dawson
Assistant Examiner—Robert James Popovics
Attorney, Agent, or Firm—Marshall & Melhorn

[57] ABSTRACT

A filter assembly or bottle filter for use in bottles or reservoirs of varying shapes and sizes is provided. The assembly has a cap or closure member sealingly connected to a filter body or support having a pair of fluid passageways. A pair of fluid passageways in the cap or closure member are in fluid communication with the pair of passageways in the filter body. A filter of a size to pass through the opening of a reservoir is connected to the opposite end of one of the axially extending passageways in the filter body or support. One of the fluid passageways is used to draw the fluid being filtered through the filter, through one of the passageways in the filter support or filter body and out one of the passageways in the cap or closure member. A pressure monitoring device is connected to the other fluid passageway to monitor the level of the fluid in the reservoir.

2 Claims, 2 Drawing Sheets

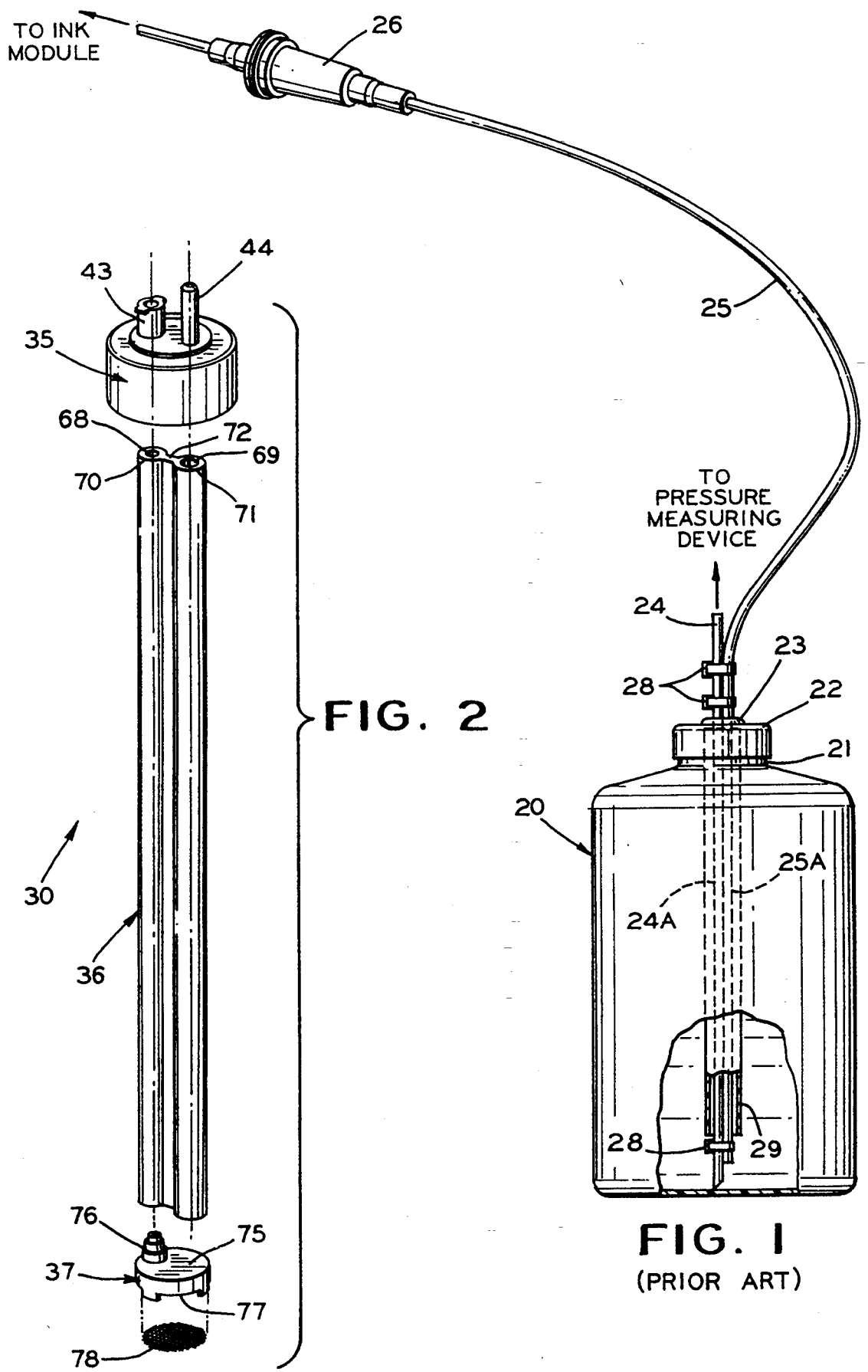

FILTER ASSEMBLY INCLUDING A FILTER AND CLOSURE MEMBER

BACKGROUND OF THE INVENTION

1. Field of the Invention

The present invention deals with filter assemblies. More particularly, the present invention deals with filter assemblies insertable in a bottle or reservoir. Most particularly, the present invention deals with a filter assembly which is placed in or connected to a reservoir of printing ink to filter the ink before it is carried to an ink module connected to a printing head.

2. Description of the Prior Art

Reservoir or bottle filters generally must meet two requirements. They must provide an effective and efficient method of filtration, and they must provide a way of measuring the level of fluid, such as ink, in a reservoir. In addition, they should be reliable and cost effective.

One such prior art filter is the Excel Series sold by Video Jet Systems International, Inc. of Wood Dale, Ill. This prior art filter has a cap having a grommet. Two thin flexible tubes are passed through the grommet into the reservoir. A larger flexible tube is passed over the smaller tubing, and held in place with a retaining means such as a rubber band. One of the tubes extends down slightly further then the other tube. This is the tube into which the fluid or ink is drawn.

To provide a filter, an external in-line filter is connected to the supply line by a pair of cable ties. The other tube serves as a level determining tube, and the movement of the fluid up and down in the tube provides a change in air pressure which can easily be measured by means well known in the art.

While this known filter is generally satisfactory, the fact that there must be a separate in-line filter outside the reservoir makes the filter somewhat bulky, and unwieldy. In addition, it is costly to manufacture. Thus, those skilled in the filter art continued to search for a satisfactory solution to the problem of providing a filter easily insertable into reservoir from which fluid was being drawn, and wherein the construction is compact and less expensive to manufacture.

SUMMARY OF THE INVENTION

A filter assembly is provided having a filter body with a pair of axially extending, parallel, fluid passageways. A cap or closure member is sealingly connected to said filter body or filter support at one end thereof, and also has a pair of fluid passageways. The closure member is connected to the filter body in such a way that the pair of fluid passageways in the closure member is in fluid communication with the pair of passageways in the filter body. A filter of a size to pass through the opening of a reservoir is connected to the other end of one of the axially extending passageways.

In one embodiment of the present invention a bottle filter is provided having a filter body with a first and a second parallel, spaced, axially extending passageway. Each of the parallel, spaced, axially extending hollow passageways has a first and a second end. A filter is connected to the second end of one of the hollow passageways. A closure member is sealingly connected to the filter body proximate the first end of each of the parallel hollow passageways. The closure member has first and second outlets in fluid communication with the first and second hollow passageways.

In another embodiment of the invention, a filter assembly for use in a fluid reservoir is provided. The filter assembly includes a cap having a pair of fluid ports. A filter support having a pair of axially extending passageways is sealingly connected to the cap in such a manner as to have each one of the pair of ports in fluid communication with one of the passageways. A filter is connected to one of said passageways opposite said cap.

Therefore, it is an object of the present invention to provide a filter assembly having a self-contained filter and useable in a wide variety of reservoirs.

A further object of the present invention is to provide a bottle filter having a self-contained filter which is of a size to pass through an opening in the bottle and provide efficient filtration of a fluid.

A still further object of the present invention is to provide a bottle filter of the foregoing nature which is of a simplified construction.

A still further object of the present invention is to provide a filter assembly having a filter body or filter support made of a rigid material and having a pair of parallel, spaced, axially extending passageways therein.

A still further object of the present invention is to make a filter assembly for insertion in a bottle which is of small size, and of fairly rigid construction, for easy handling.

A further object of the present invention is to make a filter assembly of the foregoing nature manufactured out of polypropylene.

A further object of the present invention is to make a bottle filter of a simple but rigid construction which is relatively simple and easy to manufacture.

Further objects and advantages of this invention will be apparent from the following description and dependent claims, referenced being made to the accompanying drawings forming a part of the specification wherein like reference characters designate corresponding parts in the several views.

BRIEF DESCRIPTION OF THE DRAWINGS

FIG. 1 is an elevational view of a known prior art device shown in operative position in a bottle or reservoir.

FIG. 2 is an exploded, perspective, view of a construction embodying the present invention.

Figure 3:
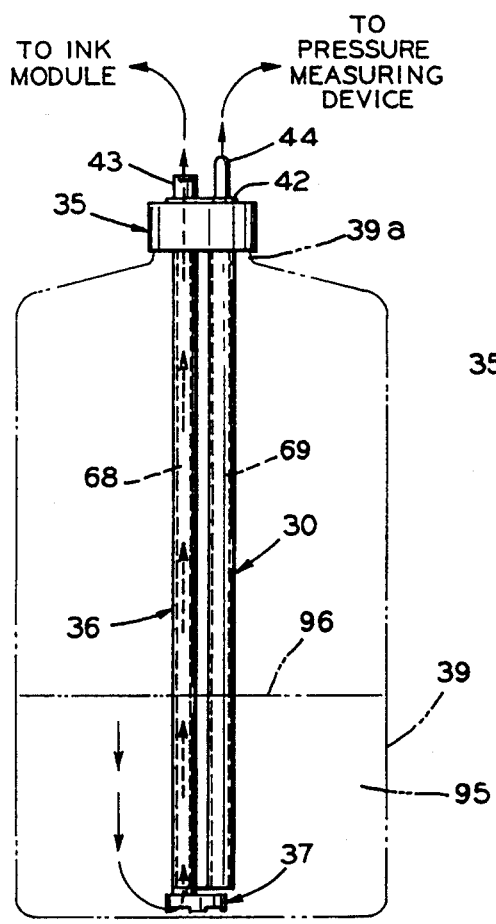
FIG. 3 is an elevational view of the construction shown in FIG. 2.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation."

DETAILED DESCRIPTION OF THE PREFERRED EMBODIMENTS

Referring to FIG. 1, there is shown the known prior art bottle or reservoir filter, such as the Excel Series, manufactured by VideoJet Systems International of Wood Dale, Ill. There is shown a reservoir or bottle 20 having an inlet or neck 21, on which is connected or mounted a cap 22. A grommet 23 is placed through an opening in the cap (not shown). A pair of thin, flexible tubes or supply lines are run through the grommet 23. A first supply line 24 goes to a pressure measuring device of a type well known in the art. A second supply line 25 goes to an ink module.

Interposed in the supply line 25 is an in-line or replenishment filter 26 such as the model no. SP355 manufactured by Video Systems International, Inc. of Wood Dale, Ill. The lower ends of the first and second supply lines (24, 25), indicated as 24a and 25a, are below the grommet 23, and interiorly of the reservoir 20. The supply lines 24 and 25 are held together by a plurality of cable ties or bands 28 which maintain them in a predetermined position.

Between the grommet 23 and the lowermost cable tie 28 is a large plastic tube 29 which aids in adding stiffness to the assembly and maintaining the first and second supply lines (24, 25) in position.

While this known prior art device is generally satisfactory, it is of an unnecessarily complicated construction, having many pieces of plastic tubing and other parts, as well as an external filter 26 which can be damaged or leak. The construction of the present invention, shown in an exploded view in FIG. 2, is designed to eliminate the problems present in prior art filters.

Shown in FIGS. 2 and 3 is a bottle filter, or filter assembly, generally designated by the numeral 30. The bottle filter 30 generally comprises a cap or closure member 35 sealingly connected to a filter body or filter support 36. A filter 37 is connected to the filter body opposite the cap 35.

Figure 4:
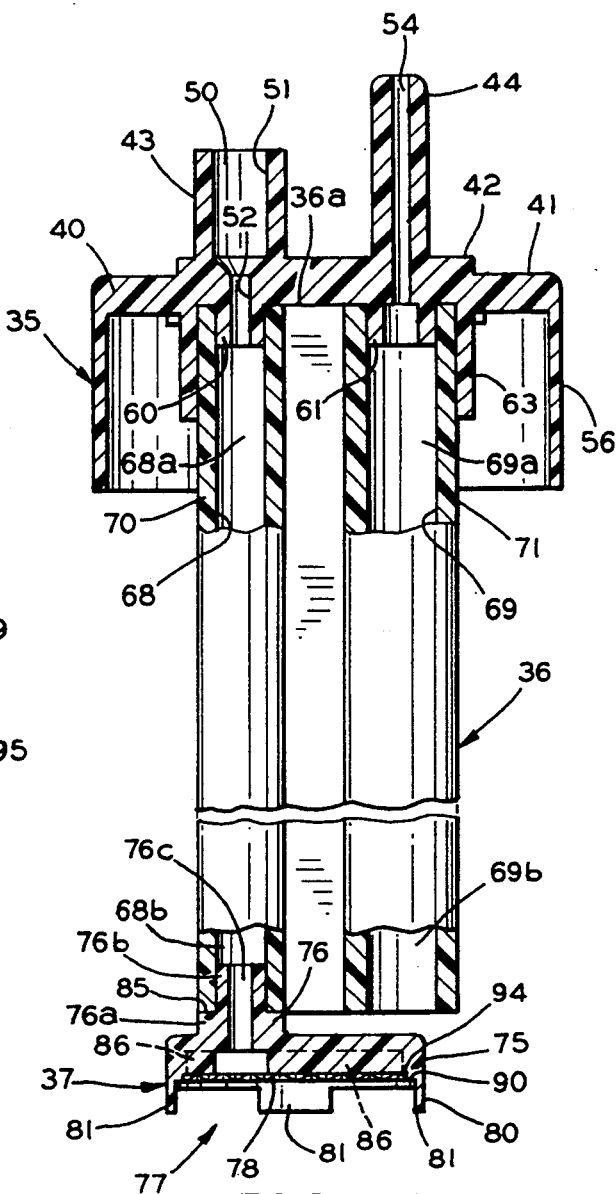
FIG. 4 is an enlarged elevational view, partly in section, of the construction shown in FIG. 3.
Figure 5:
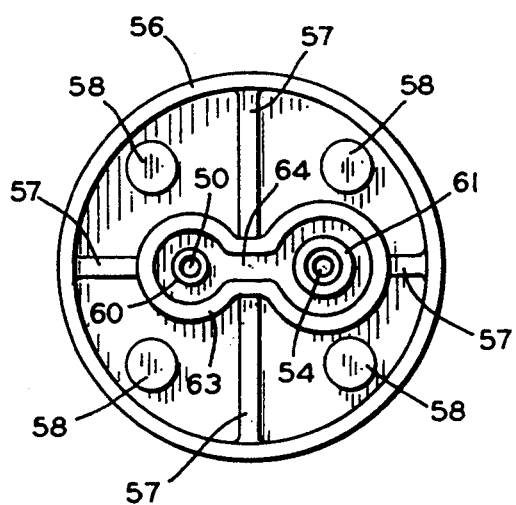
FIG. 5 is a bottom plan view of a portion of the construction shown in FIG. 4.

Referring now to FIGS. 3, 4, and 5, the filter assembly 30 is shown placed in the inlet 39a of a reservoir 39. The reservoir 39 is shown in phantom lines to emphasize that the construction of the present invention can be used with any size or shape of reservoir or bottle.

The cap or closure member 35 has a floor 40 having a first or upper surface 41. Projecting upwardly from the first surface 41 is a raised circular portion 42. Extending upwardly from the raised circular portion 42 of the cap 35 are a luer 43 and a conduit 44. The luer 43 is intended to receive a standard connection well known in the art for making a fluid tight connection between a reservoir and the device that is to receive fluid from the reservoir. No further description of a luer is believed necessary. Other connecting means may be used if desired.

Contained within the luer 43 is a first port or outlet or fluid passageway 50. The first port or outlet or fluid passageway 50 has a first or larger portion 51 and a second or smaller portion 52. A second port or outlet or fluid passageway 54 is found within the conduit 44.

The cap or closure member 35 further includes an outer, circular, downwardly depending rim or wall 56. Threads or other connecting means (not shown) may be provided for connection to a reservoir, or the wall surfaces may be left smooth, as shown in the preferred embodiment. Downwardly depending reinforcing ribs 57 may be provided if desired.

A plurality of bosses 58 are provided to space the floor 40 of the cap 35 from the rim 39a of the reservoir 39 to provide for venting thereof. A first circular rim 60 encircles the second portion 52 of the first fluid passageway 50 for purposes to be explained hereinafter. The rim 60 depends downwardly from the floor 40 of the cap 35.

A second rim 61 encircles the second fluid passageway 54 for purposes to be herein described. The second rim 61 also depends downwardly from the floor 40 of the cap 35. Surrounding the first rim 60, and the second rim 61 and spaced therefrom, is a downwardly depending irregularly shaped inner wall 63.

The area or space 64 of the floor 40 between the downwardly depending irregularly shaped inner wall 63, the first rim 60, and the second rim 61 is roughly of a "bar bell" shape and will correspond to the cross sectional shape or area of the filter body 36 to be described herein immediately below. While the shape shown is roughly of a "bar bell" shape, any desired shape can be created as long as it is complementary in shape to the cross sectional shape or area of the filter support 36.

The filter body or filter support 36 has a pair of parallel, spaced, axially extending hollow passageways which may be such as first hollow passageway 68 and second hollow passageway 69. First hollow fluid passageway 68 has first end 68a and second end 68b. Second hollow fluid passageway 69 has first end 69a and second end 69b. The first hollow fluid passageway 68 and the second hollow passageway 69 are preferably parallel, and spaced apart a desired distance. They are formed in a filter body or support 36 having a first peripheral wall 70 surrounding the first hollow fluid passageway 68 for its entire length, and a second peripheral wall 71 surrounding the second hollow fluid passageway 69 for its entire length.

The first peripheral wall 70 and the second peripheral wall 71 are separated and maintained in a spaced apart axially extending parallel relationship by a spacer member or rib 72. The spacer member or rib 72 may extend the entire length of the filter support 36, or for only part of its length. Also, a plurality of spacer members or ribs 72 may be provided instead of one long spacer member or rib 72. These alternate constructions of the rib are well within the scope of the present invention.

The first or upper end 36a of the filter body 36 coincides with the upper ends (68a, 69a) of the first fluid passageway 68 and the second fluid passageway 69. The shape of the upper end 36a of the filter body 36, as determined by the first peripheral wall 70, the second peripheral wall 71, and the spacer member or rib 72 is complementary to the shape of the area 64 between the downwardly depending irregularly shaped wall 63 and the first rim and the second rim (60, 61). In the manufacture of the construction of the present invention the first end of the filter body or support 36 is inserted in the space defined by the first rim 60, second rim 61, and irregular wall 63, and the cap 35 and the filter body 36 are permanently joined by sonic welding, chemical bonding, or other desired means of joining.

As can be seen in FIG. 4, the first port or fluid passageway 50 is in fluid communication with the first hollow fluid passageway 68. The second port or fluid passageway 54 is in fluid communication with the second hollow fluid passageway 69. Insertable into the lower or second end 68b of the first hollow fluid passageway 68 is filter 37, having a filter housing 75 including a stepped outlet 76 and an inlet 77. A screen type filter 78 fits into the inlet 77 of the filter housing 75.

Figure 6:
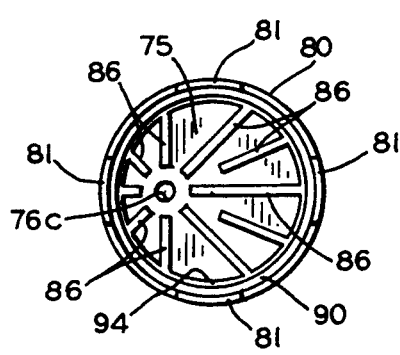
FIG. 6 is a bottom plan view of another portion of the construction shown in FIG. 4.

As can be seen from FIGS. 4 and 6, the inlet 77 of the filter housing 75 includes a downwardly depending circular wall 80, having a plurality of lugs 81 extending therefrom to insure a spacing between the filter 37 and the bottom of the reservoir 39. The outlet of the filter 76 includes a portion of first diameter 76a and second, preferably smaller, diameter 76b. The difference in diameter provides an abutment surface or shoulder 85 which provides a stop for the filter 37 against the lower end 68b of the first fluid passageway 68.

A fluid outlet passage 76c extends through the stepped outlet 76 to provide fluid communication between the filter inlet 77 and the first hollow fluid passageway 68.

A filter screen 78 is interposed between the filter inlet 77 and the outlet passageway 76c. The filter screen may be made of any practical material depending on the fluid being filtered. In the preferred embodiment being described the filter is a 10 micron screen made out of polypropylene and is effective for filtering ink used in ink jet printers.

The filter screen 78 is supported by annular diametral wall 94 formed interiorly of the filter housing 75, and a plurality of converging ribs 86 having their roots in the annular wall 94 and converging uniformly toward the outlet passageway 76c. The annular wall is of a diameter slightly less than the diameter of the filter housing as measured between the lugs 81, leaving a small step or rim 90. The filter screen 78 may be sonically welded, chemically bonded or fastened by other appropriate means, depending on the application to the top surfaces of diametral wall 94 and ribs 86. The connecting or mounting means for the filter must be such that it is sealingly connected to the annular wall 94 and the ribs 86 to prevent any leakage passed the filter media making up the filter screen 78.

Preferably the cap 35, filter support 36, and filter 37 are all made of the same material. While in the preferred embodiment the cap 35, filter support 36, and filter 37 are all made of polypropylene, a wide range of materials may be used. These materials can include PTFE, nylon, polyamide, polyester, teflon, and other flouropolymers. The construction of the present invention may be made of any polymer which is chemically and temperature compatible with the matter being filtered.

Referring to FIG. 3, in operation there will be a fluid 95 in the reservoir 39 which may be of a sufficient quantity to be at a level indicated by the numeral 96. As indicated by the arrows showing the direction of flow, fluid will be drawn through the filter 37 into the first hollow passageway 68 of the filter body or support 36 and exit the cap 35 through the luer 43 on its way to the ink module of a laser jet printer. The fluid 96 will remain at that level in the second hollow fluid passageway 69. A pressure measuring device of any practical type would be connected to the conduit 44 and the rise or drop in the level 96 will cause a change in the air pressure within the second hollow fluid passageway 69, which can be measured and related to the level of fluid 95 in the reservoir 39.

Thus, by carefully studying the problems present in the art of filter assemblies for use with bottles and reservoirs, a novel, easy to construct bottle filter has been provided.

I claim:
1. A filter assembly, including:
   a) a one-piece filter body having;
      i) a first peripheral wall enclosing a first, axially extending hollow passageway, said first, axially extending hollow passageway having a first end and a second end,
      ii) a second peripheral wall enclosing a second, axially extending, hollow passageway, said second, axially extending hollow passageway parallel to said first axially extending hollow passageway and having a first end and a second end, and
      iii) a rib connecting said first peripheral wall and said second peripheral wall,
   b) filter connected to the first end of one of said parallel, spaced, axially extending hollow passageways, said filter including;
      i) a filter housing having an inlet and an outlet,
      ii) an annular wall formed interiorly of said filter housing, and
      ii) a screen filter supported by said annular wall, and
   c) a closure member sealingly connected to said filter body and the second end of each of the parallel, spaced, axially extending hollow passageways, said closure member having first and second ports in fluid communication with said first and said second hollow passageways of said filter body, said closure member further including;
      i) a floor portion,
      ii) an outer peripheral wall downwardly extending from said floor portion,
      iii) a first rim surrounding said first port,
      iv) a second rim surrounding said second port, and
      v) an irregularly shaped inner wall downwardly depending from said floor portion and being spaced from said first rim and said second rim, the space between said first rim, said second rim, and said inner, irregularly shaped wall being complementary in shape to the shape of said filter body,
said closure member and said filter body being permanently joined together.
2. A filter assembly, including:
   a) a one-piece filter body having a first and a second parallel, spaced, axially extending hollow passageway, each of the parallel, spaced, axially extending hollow passageways having a first end and a second end,
   b) a filter connected to the first end of one of said parallel, spaced, axially extending hollow passageways, said filter including
      i) a filter housing having an inlet and an outlet,
      ii) a wall formed interiorly of said filter housing,
      iii) a screen type filter supported by said wall, and
      iv) a plurality of converging ribs formed interiorly of said filter housing and converging toward the filter outlet, and
   c) a closure member sealingly connected to said filter body and the second end of each of the parallel, spaced, axially extending hollow passageways, said closure member having first and second ports in fluid communication with said first and said second hollow passageways of said filter body, said closure member and said filter body being permanently joined together.

* * * * *